(12) United States Patent
Serkh et al.

(10) Patent No.: US 7,013,646 B1
(45) Date of Patent: Mar. 21, 2006

(54) AUXILIARY POWER SYSTEM FOR A MOTOR VEHICLE

(75) Inventors: Alexander Serkh, Troy, MI (US); Imtiaz Ali, Lathrup Village, MI (US)

(73) Assignee: The Gates Corporation, Denver, CO (US)

( * ) Notice: Subject to any disclaimer, the term of this patent is extended or adjusted under 35 U.S.C. 154(b) by 205 days.

(21) Appl. No.: 10/991,548

(22) Filed: Nov. 18, 2004

(51) Int. Cl.
*F01B 21/04* (2006.01)

(52) U.S. Cl. ........................................................ 60/698

(58) Field of Classification Search ................ 60/698, 60/716
See application file for complete search history.

(56) References Cited

U.S. PATENT DOCUMENTS

| | | | |
|---|---|---|---|
| 4,762,170 A | 8/1988 | Nijjar et al. .................... 165/43 |
| 4,825,663 A | 5/1989 | Nijjar et al. .................... 62/236 |
| 4,879,501 A | 11/1989 | Haner ........................... 318/645 |
| 5,373,198 A | 12/1994 | Lopez Jimenez ............ 307/68 |
| 5,495,912 A | 3/1996 | Gray, Jr. et al. ............. 180/165 |
| 5,558,173 A | 9/1996 | Sherman ..................... 180/53.8 |
| 5,847,470 A | 12/1998 | Mitchell ....................... 290/45 |
| 6,048,288 A | 4/2000 | Tsujii et al. .................... 477/5 |
| 6,662,580 B1 | 12/2003 | Suitou et al. .............. 62/228.1 |
| 6,677,684 B1 | 1/2004 | Kennedy ..................... 290/4 C |
| 6,796,367 B1 * | 9/2004 | Blacquiere et al. ........... 165/41 |
| 2003/0213252 A1 * | 11/2003 | Kuribayashi ................. 62/133 |
| 2004/0144080 A1 * | 7/2004 | Suzuki ....................... 060/276 |

\* cited by examiner

*Primary Examiner*—Hoang Nguyen
(74) *Attorney, Agent, or Firm*—J. A. Thurnau, Esq.; C. H. Castleman, Esq.; S. G. Austin, Esq.

(57) ABSTRACT

An auxiliary power system for a motor vehicle primary engine used to drive primary engine accessories when the primary engine is not operating. The system comprises a secondary engine that drives a hydraulic pump. The hydraulic pump is connected to a hydraulic motor. The hydraulic motor is integrated with an accessory belt drive system on a primary engine. The secondary engine drives the ABDS system through the hydraulic pump and hydraulic motor when the primary engine is not operating, thus allowing various primary engine accessories such as air conditioning to be operated while the primary engine is off. A one-way clutch on the primary engine crankshaft prevents the primary engine crankshaft from being turned when the hydraulic motor is driving the belt. A one-way clutch on the hydraulic motor prevents it from being driven when the primary engine is in operation.

13 Claims, 3 Drawing Sheets

AUXILIARY POWER SYSTEM FOR A MOTOR VEHICLE

FIELD OF THE INVENTION

The invention relates to an auxiliary power system for a motor vehicle, namely, a secondary engine used to drive primary engine accessories when the primary engine is not operating.

BACKGROUND OF THE INVENTION

Almost two million long-haul trucks deliver various goods throughout the United States each year. The great majority of long haul trucks utilize some form of diesel engine. It is not uncommon for long-haul trucks to be driven 150,000 miles annually.

During trips as well as during loading and unloading operations truck engines are operated at idle for an average of 1900 hours. Idling large diesel engines is necessary to provide power needed to operate the truck equipment, power lights, appliances, communication gear, and air conditioning or heating for the cab and sleeping area when drivers are resting. Idling the engines for heavy trucks can cost about $1.25/hr in fuel, $0.07/hr in preventative maintenance, and $0.07/hr in overhaul costs at current fuel and maintenance rates.

While idling an engine provides the power needed to maintain a comfortable environment for the driver it has unwanted consequences. Operating a high horsepower diesel engine at low RPM under light load results in the incomplete combustion of fuel and gives off undesirable exhaust emissions. In addition, operating the diesel engine at low speed causes twice the wear of internal parts compared with the road speed RPM.

Auxiliary power units (APU's) are known which provide power while significantly reducing the need to idle the primary engine. The incentives for using APU's include reduced fuel use and engine wear, prolonged engine life and cuts in maintenance costs, and elimination of approximately 70%–90% of diesel emissions during long periods of engine idling.

Auxiliary power units are portable, truck mounted systems that can provide climate control and power for trucks without the need to operate the primary diesel engine at idle. Prior art systems generally consist of a small internal combustion engine (usually diesel) equipped with a variety of accessories.

The APU diesel engine uses the same coolant and coolant system as the primary diesel engine. During stops when the primary diesel is turned off the APU diesel circulates the coolant to the primary diesel to keep it warm during winter months for easy starts. The same coolant is also routed to the heater core inside the cabin to provide heat to the drive. The APU alternator can provide power for the interior lights, marker lights, and recharging the battery. An inverter can convert the alternator DC current to 110V AC power for televisions and microwaves. The APU air conditioner compressor uses the primary engine installed refrigerant, expansion valve, evaporator, and blower to provide chilled and dehumidified air to the cabin. The APU has its own condenser to reject the heat from the refrigerant.

As an example, APU's are known which comprise a two cylinder diesel engine driving a generator and an alternator. The generator provides power to a 110 v HVAC system (separate from the factory installed air conditioning system) and electrical receptacles for microwaves, TVs, etc. The alternator is used to charge the batteries and run marker lights. In some instances, the small diesel engine drives a water pump that circulates coolant to the large diesel engine to keep it warm for starting during the winter months.

Another known APU comprises a small diesel engine which drives a generator. The generator provides power for electrically driven accessories such as the air conditioning compressor and the water pump. Since the accessories are driven by electrical motors and are powered by the APU, the primary diesel engine can be off. The speed of each accessory can be individually controlled and, therefore, provide only the conditioned air or such other power needed at that moment. The accessories are not forced to rotate at some fixed speed ratio of the engine speed.

Representative of the art is U.S. Pat. No. 6,048,288 (2000) to Tsujii et al. which discloses an engine wherein auxiliary machines are operated by a motor generator where the engine is stopped to reduce electric power consumption.

What is needed is an auxiliary power system for a motor vehicle engine using a secondary engine to drive the motor vehicle engine belt driven accessories through a hydraulic system and one-way clutches when the motor vehicle primary engine is turned off. The present invention meets this need.

SUMMARY OF THE INVENTION

The primary aspect of the invention is to provide an auxiliary power system for a motor vehicle engine using a secondary engine to drive the motor vehicle engine belt driven accessories through a hydraulic system and one-way clutches when the motor vehicle primary engine is turned off.

Other aspects of the invention will be pointed out or made obvious by the following description of the invention and the accompanying drawings.

The invention comprises an auxiliary power system for a motor vehicle primary engine used to drive primary engine accessories when the primary engine is not operating. The system comprises a secondary engine that drives a hydraulic pump. The hydraulic pump is connected to a hydraulic motor. The hydraulic motor is integrated with an accessory belt drive system on a primary engine. The secondary engine drives the ABDS system through the hydraulic pump and hydraulic motor when the primary engine is not operating, thus allowing various primary engine accessories such as air conditioning to be operated while the primary engine is off. A one-way clutch on the primary engine crankshaft prevents the primary engine crankshaft from being turned when the hydraulic motor is driving the belt. A one-way clutch on the hydraulic motor prevents it from being driven when the primary engine is in operation.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Prior art auxiliary power unit (APU) solutions for providing cabin power and comfort during times when the primary diesel engine of a large truck is turned off are not optimal. Many of the prior art systems duplicate accessories and are cumbersome to integrate into existing systems.

Figure 1:
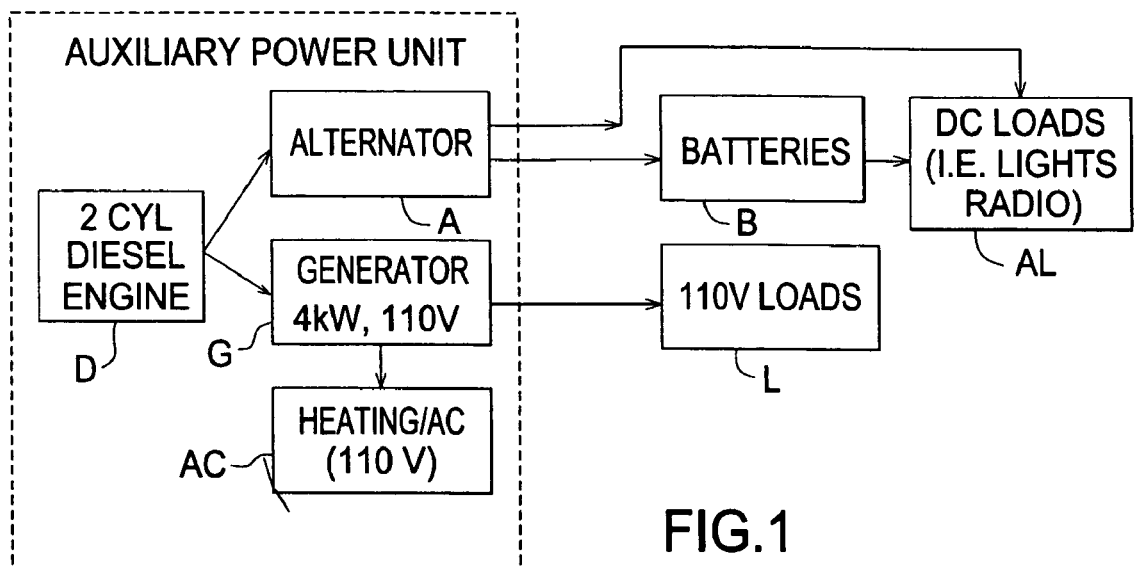
FIG. 1 is a schematic view of a prior art system.

As an example, APU's are known which comprise a two cylinder diesel engine driving a generator and an alternator. FIG. 1 is a schematic view of a prior art system. A two cylinder diesel engine (D) drives a generator (G). The generator provides power to a 110 v heating ventilating and air conditioning system (AC), which is separate from the factory installed AC system on the primary engine. 110V power is also provided for other loads (L) including microwaves, TVs, etc. Alternator (A) charges the batteries (B) and may be used to illuminate marker lights and otherwise provide power to other DC loads (AL). In some instances, the small diesel engine (D) drives a water pump (not shown) to circulate coolant to the primary diesel engine keeping it warm for easier starting during the winter months.

Figure 2:
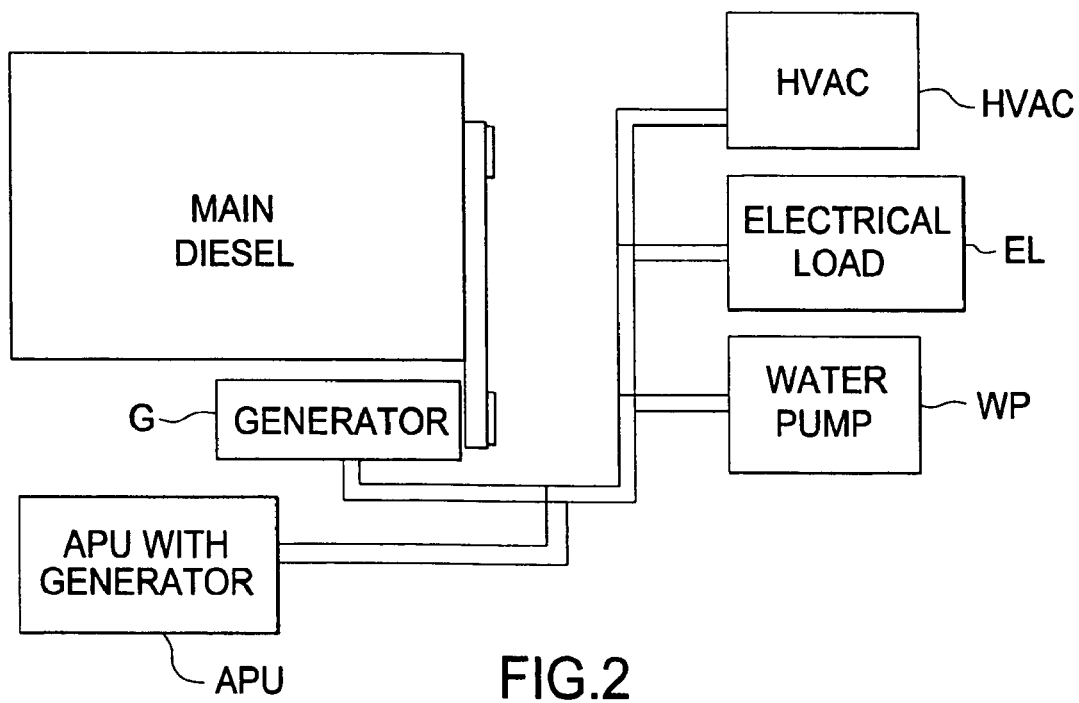
FIG. 2 is a schematic view of a prior art system.

FIG. 2 is a schematic view of another prior art system. An APU drives a generator. The APU generator is interconnected to the vehicle electrical system. It provides electrical energy to drive the heating ventilating and air conditioning system (HVAC), electrical accessory loads (EL) and electrical water pump (WP) when the primary diesel engine is not operating. Of course, when the primary diesel is in operation it drives a generator which provides power to the noted systems. The APU is disconnected from the system when the primary diesel is in operation.

Figure 3:
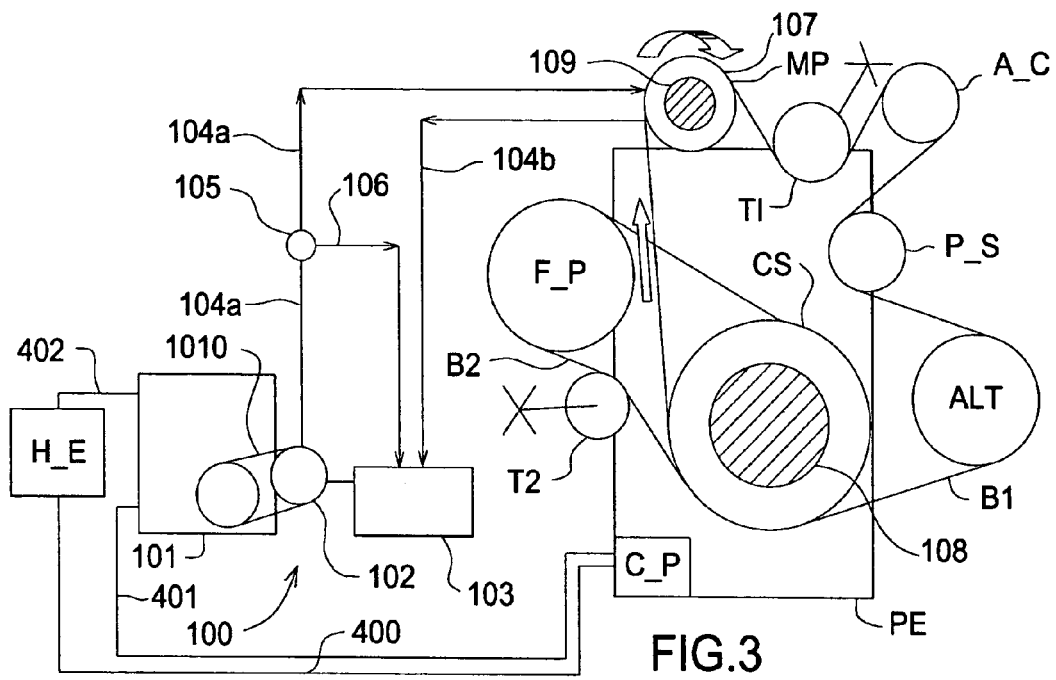
FIG. 3 is a schematic view of the inventive system.

FIG. 3 is a schematic view of the inventive system. The inventive system 100 comprises a fluid driver 102 driven by an engine 101 through belt 1010. Engine 101 comprises a two cylinder diesel engine. Although two cylinder diesel engines are readily available and are included in the preferred embodiment of this invention, the inventive system is not limited to such an engine. Other suitable engines are available and may be used provided the selected engine generates the required torque and speed to drive the fluid driver 102. A diesel engine is selected in this embodiment because diesel is the fuel most commonly used in large trucks.

Fluid driver 102 may comprise any suitable hydraulic pump known in the art. Fluid driver 102 is connected to a fluid driven motor 107 by hydraulic piping 104. Fluid driven motor 107 may comprise any compatible hydraulic motor known in the art. Excess hydraulic fluid is stored in reservoir tank 103.

Fluid system piping 104 comprises a supply hose 104a and return hose 104b. Supply hoses 104a conduct the high pressure fluid from the hydraulic pump 102 to the hydraulic motor 107. A relief valve 105 is included in the hydraulic hose 104 to vent pressure excursions caused by system upsets, for example, a locked hydraulic motor rotor. Any fluid released from the relief valve 105 is returned to tank 103 through hose 106.

In the inventive system, the fluid driven hydraulic motor 107 is incorporated into the accessory belt drive system (ABDS) located on the primary engine (PE). In most cases the PE will comprise a diesel engine since these are most commonly used for large trucks. However, this is not offered by way of limitation since other systems may be used such as gasoline or natural gas fueled engines.

The ABDS comprises a serpentine belt (B1) entrained between fluid driven motor 107 to each pulley for an air conditioner compressor (A_C), a power steering pump (P_S) and an alternator (ALT). A tensioner (T1) known in the art maintains a proper belt tension.

A second serpentine belt (B2) is entrained between the crankshaft (CS) pulley and the fuel pump (F_P) pulley. A tensioner (T2) known in the art maintains a proper belt tension in belt (B2). Of course, pulley (CS) comprises a dual pulley thereby enabling it to be entrained to each belt (B1) and (B2).

Belts (B1) and (B2) comprise multiple-ribbed belts known in the art, but may also comprise v-belts or flat belts as may be required by a system design. Other systems may comprise other driven accessories in a different configuration. These components in this configuration are not offered by way of limitation, but only by way of example.

A one way overrunning clutch 108 is installed in the primary engine crankshaft pulley (CS). A one way overrunning clutch 109 is also installed on the fluid driven motor pulley (MP). Suitable one way clutches are available from various sources including but not limited to Borg Warner and the Formsprag Clutch Div. of Warner Electric.

The inventive system drives the primary engine accessories during the period when the primary engine would otherwise be at idle. In this case the primary engine is off while the APU system is in operation. APU engine 101 drives fluid driver 102 through belt 1010. Fluid pump 102 pumps high pressure hydraulic fluid through pipe 104a to fluid motor 107. Fluid motor 107 drives belt (B1) which in turn drives the noted accessories. Crankshaft pulley (CS) is driven with the ABDS by fluid driven motor 107, however, one way clutch 108 disengages the crankshaft from the crankshaft pulley (CS) so the primary engine crankshaft does not rotate. The A_C is also driven by belt (B2).

Tensioners T1 and T2 maintain proper belt tension in either operational case, namely, when the inventive APU system is operating and the fluid motor 107 is driving the ABDS system, or, when the primary engine is operating and the crankshaft pulley (CS) is driving the ABDS and the APU is off.

Both engines share the same coolant system. The belt driven coolant pump (C_P) of the primary engine circulates the coolant heated by engine 101 through pipes 400, 401, 402. Coolant also circulates through a heat exchanger (H_E), such as a radiator, known in the art. The warmed coolant circulates through and warms the primary engine and provides heat to the cabin through the HVAC system.

The alternator provides power for lights, blowers, and 110V inverters. The A/C compressor operates as it does when primary engine (PE) is running. The controls within the vehicle cabin are used to adjust the temperature settings as would be the case when the primary engine was operating.

When the primary engine is operating, the APU system is disengaged and shut down. The PE crankshaft drives the ABDS system since the one way clutch 108 is engaged when the primary engine is in operation. One way clutch 109 on the fluid driven motor is disengaged so pulley (MP) rotates with belt (B1) but the shaft of the fluid motor 107 remains stationary.

The inventive system simply connects an APU to the primary engine through a reliable and robust fluid connection. The fluid connection transmits the necessary power to the primary engine ABDS so the ABDS can be economically operated while the primary engine is not required, such as when the primary engine would normally be at idle. The inventive system completely eliminates costly and complicated electrical connections between the APU and the primary engine systems, other than perhaps a starter circuit and minimal control circuits. Simple hydraulic hoses are used to connect the APU output to the primary engine accessory belt drive system. The noted one-way clutches allow the primary engine ABDS to be fully utilized in either operating mode, namely, primary engine on or off. The inventive system eliminates any need for duplicate accessories, for example a generator.

The following calculation represents an example system having a fluid driven motor that will provide enough torque to drive the ABDS when the primary diesel engine is off. A fluid driven motor of just over one cubic inch displacement is sufficient. A hydraulic fluid flow rate of approximately 9.3 gal/min at 3000 psi is required to deliver approximately 50 Nm torque at 1800 RPM. At a speed ratio of 3.0, the ABDS accessories will operate as if the primary engine was idling at approximately 600 RPM.

Hydraulic System

|  | Driver | Motor |
|---|---|---|
| Volumetric Efficiency | 95% (3000 PSI) | 90% (3000 PSI) |
| Mechanical Efficiency | >90% for >900RPM | 85%–90% |

Accounting for losses in the hoses and any required system valves, the overall mechanical efficiency between the input to the fluid driver and the output of the fluid driven motor should be in the approximately 75%–80% range.

Figure 4:
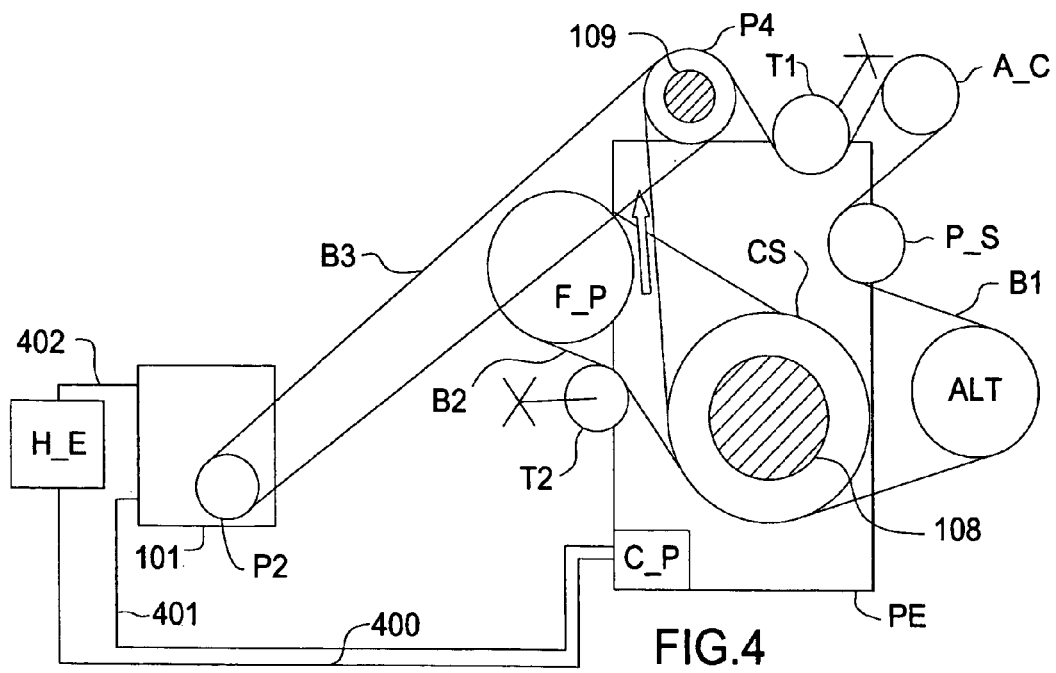
FIG. 4 is a schematic view of an alternate embodiment.

FIG. 4 is a schematic view of an alternate embodiment. When the primary engine is operating, the crankshaft will drive the ABDS system since the one way clutch 108 on the crankshaft pulley will no longer be overrunning. However, an alternate solution is to use a mechanical drive line system which connects the engine 101 and primary engine ABDS by a belt (B3) instead by the foregoing described hydraulic based system. In this embodiment both the primary engine (PE) and the APU engine 101 are installed with their crankshafts being substantially parallel. The APU diesel engine drives a crankshaft mounted pulley P2 which is connected to a driven pulley (P4) via a belt (B3). Belt (B3) may comprise either a v-belt or a multiple-ribbed belt. Driven pulley (P4) is a dual pulley connected to one of the ABDS accessory shafts. Pulley (P4) comprises a dual pulley and is also engaged with belt (B1). The ABDS system is driven by (B3) when the primary engine is not operating. One-way clutches 108 and 109 operate as described previously for the hydraulic APU system, namely, the PE crankshaft is disengaged when the APU system is operating and the APU is disengaged through the one-way clutch 109 when the PE is operating. In this alternate system the APU system efficiency can be increased to up to approximately 90–92%.

| Desired Input | | | Output Parameters | | | |
|---|---|---|---|---|---|---|
| Shaft Speed (RPM) | 1800 | | Displacement (cm 3) | 17.86861 | (in^3) | 1.090409 |
| Torque (Nm) | 50 | in. lbs 442.5375 | Flowrate (L/min) | 34.96032 | (g/min) | 9.235542 |
| Mechanical Efficiency | 0.85 | | Output Power (kW) | 9.424778 | (hp) | 12.63883 |
| Volumetric Efficiency | 0.92 | | | | | |
| Delta Pressure (Bar) | 206.8427 | PSI 2999.999 | | | | |

| | | |
|---|---|---|
| Input Flow | $Q_e = \dfrac{V_g \cdot n}{1000 \cdot \eta_v}$ | liters/min |
| Output Torque | $M_e = \dfrac{V_g \cdot \Delta p \cdot \eta_m}{20 \cdot \pi}$ | Nm |
| Output power | $P_e = \dfrac{Q_e \cdot \Delta p \cdot \eta_m \cdot \eta_v}{600}$ | kW |
| Speed | $n = \dfrac{Q_e \cdot 1000 \cdot \eta_v}{V_g}$ | 1/min |
| $V_g$ | Motor Displacement per revolution | cm³ |
| n | Motor Speed | 1/min |
| Δp | Hydraulic Pressure Differential | bars |
| $\eta_v$ | Volumetric Efficiency | |
| $\eta_m$ | mechanical Efficiency | |

The hydraulic motor and hydraulic pump meeting these criteria are known in the art and are available from various suppliers including Motion Industries, Parker Hannifin Corporation, Denison Hydraulics, Eaton Hydraulics, White Hydraulics, Inc., as well as others.

The two-cylinder diesel engine 101 comprises a Kubota model Z602, although this is not offered by way of limitation.

Estimated efficiencies of the fluid pump 102 (driver) and fluid driven motor (107) are as follows:

Control Strategy

The control strategy is based upon the operating status of the primary engine and can be automatically implemented. In what would be an otherwise primary engine idle situation, the primary engine is shut down by the driver, for example, by turning off the ignition key. Upon primary engine shutdown a signal is sent by the vehicle ECU to the APU engine starter. The APU engine is started and operates so long as the primary engine is shut off. During this time the primary engine ABDS accessories are driven by the APU system as described. Upon receipt of a primary engine start signal by the ECU, such as when the truck driver turns the ignition key, the APU is automatically stopped prior to engagement of the primary engine starter. The primary engine is then started and operated as usual.

In those instances where full shut down of the vehicle is desired the APU start signal can be defeated. For example, a particular ignition key position would initiate APU engine operation, while a second ignition key position would shutdown both the primary engine and the APU engine. A third ignition key position would correspond to primary engine start and a fourth ignition key position to primary engine operation. This description is not limiting and other control schemes may be developed with equal success responsive to various operational requirements.

Figure 5:
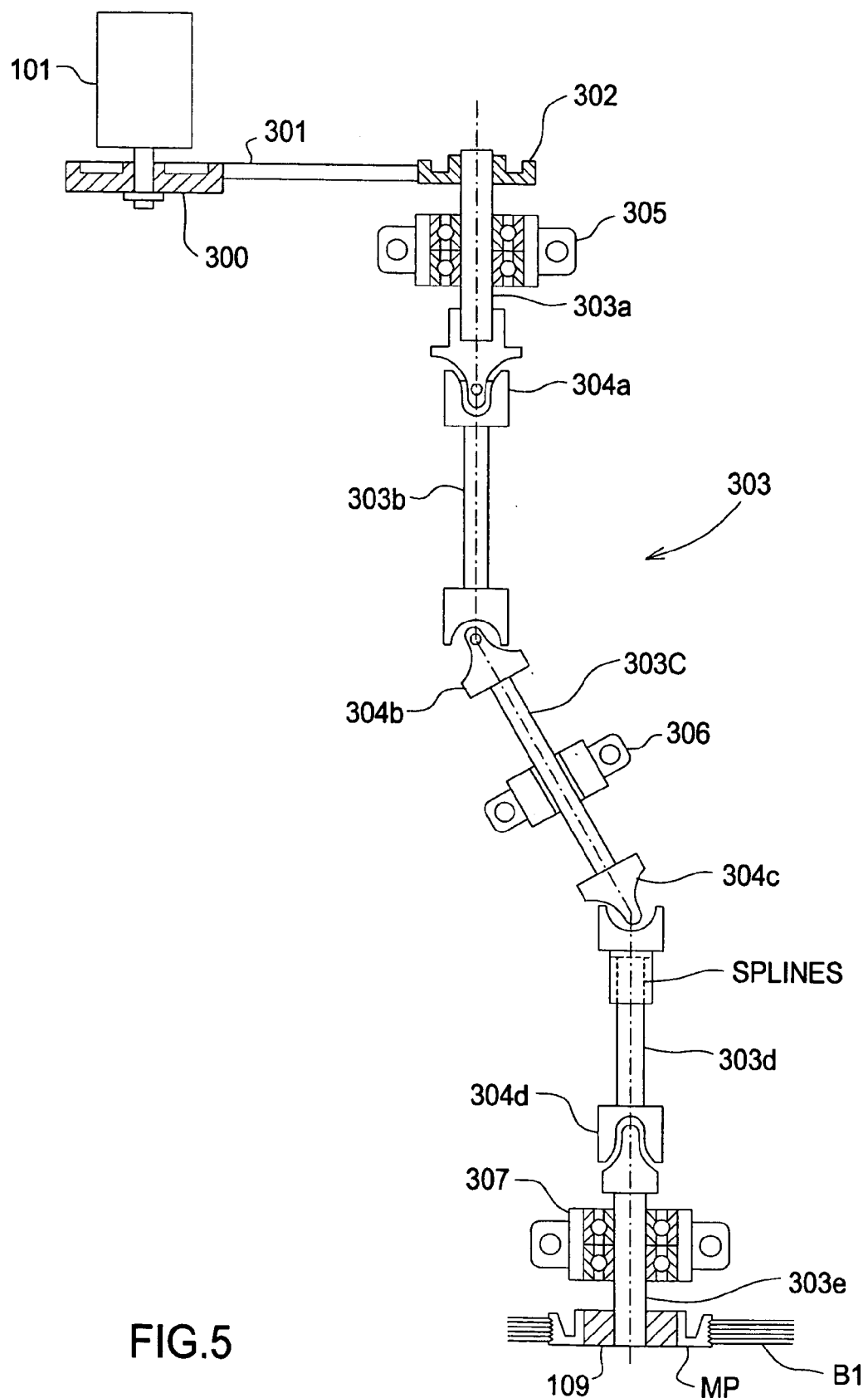
FIG. 5 is an alternate embodiment having a driveline connection between the APU and the primary engine belt drive.

FIG. 5 is an alternate embodiment having a mechanical driveline 303 connected between the APU engine and the main engine ABDS drive. In this embodiment, pulley 300 is mounted on the crankshaft of APU engine 101. Belt 301 is engaged between pulley 300 and pulley 302. Belt 301 may comprise a multi-ribbed belt or a single-v belt, each known in the art. Use of belt 301 allows pulley 302 to be located in a convenient location adjacent engine 101 as may be dictated by vehicle design.

Pulley 302 is connected to driveshaft 303a, and thereby to driveshaft 303b, 303c, 303d and 303e respectively. Driveshaft 303e is engaged with pulley MP and one way clutch 109 as described in FIG. 3. In this alternate embodiment fluid motor 107 is not used.

In order to route the driveshaft as needed to avoid obstacles in the vehicle chassis and engine bay, universal joints 304a, 304b, 304c, 304d are disposed along the driveshaft as needed. Bearings 305, 306 and 307 are also disposed along the driveline in order to provide support and alignment for each driveshaft. Bearings 305, 306, 307 may comprise pillow blocks or any other suitable type bearings known in the art. Further, each driveshaft may be splined to allow for axial expansion between bearings 306, 307 for example. The spine location depicted in FIG. 5 is for example and not by way of limitation. Driveshafts suitable for this service are available in the art from Reco-Prop (UK) and NDE Clarke Transmission Ltd. for example and not by way of limitation.

When engine 101 is in operation torque is transmitted through driveline 303 to pulley MP. Pulley MP is engaged with the belt (B1) in the ABDS system on the primary diesel engine. One way clutch 109 allows torque and power to be transmitted from the APU engine 101 through belt 301 to the primary engine ABDS system when the primary engine is not operating as otherwise described in this specification. In this mode one-way clutch 108 is disengaged as described elsewhere in this specification.

When the primary engine is in operation and belt (B1) is being driven by the primary engine crankshaft, one-way clutch 109 is disengaged and thereby does not transmit torque back to engine 101 through belt 301.

One can appreciate that the alternate embodiment comprising a driveline to transmit power from the APU engine to the primary engine allows engine 101 to be mounted in virtually any orientation. Namely, the crankshaft of engine 101 need not be parallel with the crankshaft of the primary engine (PE) as would be the case in a belt driven system as depicted in FIG. 4.

Although forms of the invention have been described herein, it will be obvious to those skilled in the art that variations may be made in the construction and relation of parts without departing from the spirit and scope of the invention described herein.

We claim:

1. An auxiliary power system for a motor vehicle comprising:
   a first engine having an accessory belt drive system comprising a belt and a driven pulley, the belt driven by a first engine driver pulley;
   the first engine driver pulley comprising a first one-way clutch, said first one-way clutch transmitting torque in a pre-determined direction;
   a second engine drivingly connected to a fluid driver;
   a fluid driven motor connected to the fluid driver, the fluid driven motor operatively engaged with the accessory belt drive system belt;
   the fluid driven motor having a second one-way clutch, said second one-way clutch transmitting torque in a pre-determined direction;
   the fluid driven motor operable to drive the accessory belt drive system when the first engine is not operating, the first one-way clutch transmitting no torque when the accessory belt drive system is driven by the fluid driven motor; and
   the second one-way clutch transmitting no torque when the accessory belt drive system is being driven by the first engine driver pulley.

2. The auxiliary power system for a motor vehicle as in claim 1, wherein the fluid driver comprises a hydraulic pump.

3. The auxiliary power system for a motor vehicle as in claim 1, wherein the fluid driven motor comprises a hydraulic motor.

4. The auxiliary power system for a motor vehicle as in claim 1, wherein the accessory belt drive system comprises a tensioner engaged with the belt.

5. The auxiliary power system for a motor vehicle as in claim 1, wherein the second engine comprises a diesel engine.

6. The auxiliary power system for a motor vehicle as in claim 1, wherein the first engine driver pulley is engaged with a first engine crankshaft.

7. An auxiliary power system for a motor vehicle comprising:
   a first engine having an accessory belt drive system comprising a belt and at least one driven pulley, the belt driven by a driver pulley;
   the driver pulley comprising a first one-way clutch;
   a second engine drivingly connected to the accessory belt drive system;
   a second one-way clutch operatively disposed between the second engine and the accessory belt drive system;
   the second engine operable to drive the accessory belt drive system when the first engine is not operating, the first one-way clutch transmitting no torque when the accessory belt drive system is driven by the second engine; and
   the second one-way clutch transmitting no torque when the accessory belt drive system is being driven by the driver pulley.

8. The auxiliary power system for a motor vehicle as in claim 7, wherein the accessory belt drive system further comprises a tensioner engaged with the belt.

9. The auxiliary power system for a motor vehicle as in claim 7, wherein the driver pulley is engaged with a first engine crankshaft.

10. The auxiliary power system for a motor vehicle as in claim 7, wherein the second engine is drivingly connected to the accessory belt drive system by a belt.

11. The auxiliary power system for a motor vehicle as in claim 7, wherein a second engine crankshaft is substantially parallel to a first engine crankshaft.

12. The auxiliary power system for a motor vehicle as in claim 7, wherein the second engine is drivingly connected to the accessory belt drive system by a driveline.

13. The auxiliary power system for a motor vehicle as in claim 12, wherein the driveline further comprises a universal joint.

* * * * *